No. 889,951. PATENTED JUNE 9, 1908.
J. MUIR.
SHOCK SHIFTER HUB.
APPLICATION FILED APR. 27, 1906.
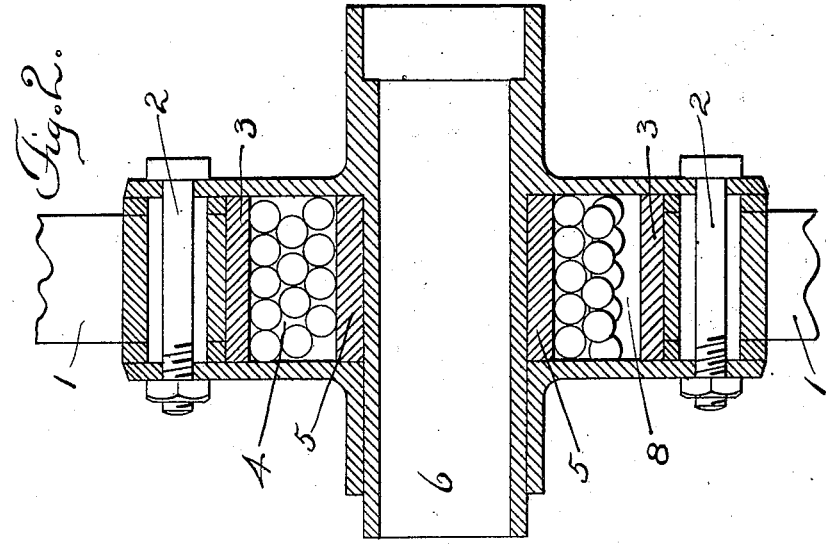
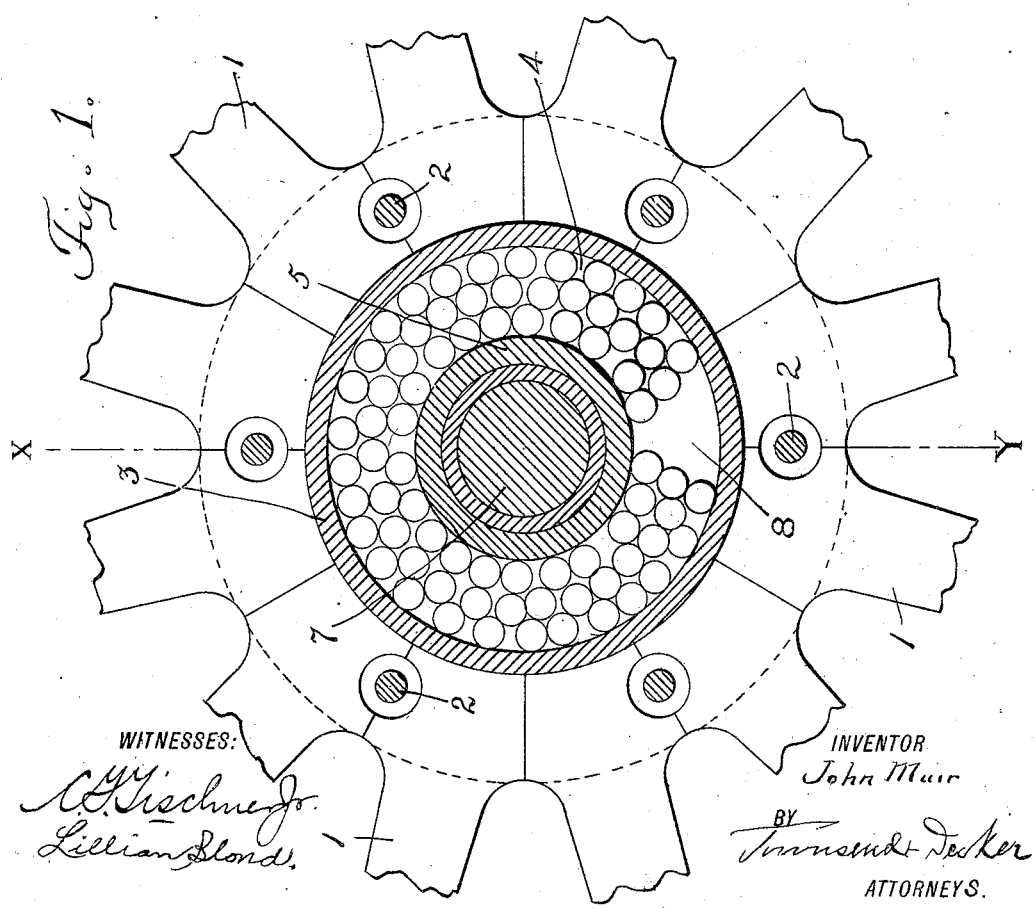
WITNESSES:
INVENTOR
John Muir
BY
Townsend Decker
ATTORNEYS.

UNITED STATES PATENT OFFICE.

JOHN MUIR, OF BEITH, SCOTLAND.

SHOCK-SHIFTER HUB.

No. 889,951.   Specification of Letters Patent.   Patented June 9, 1908.

Application filed April 27, 1906. Serial No. 313,965.

*To all whom it may concern:*

Be it known that I, JOHN MUIR, a subject of Great Britain, and resident of Mains House, Beith, in the county of Ayr, Scotland, have invented certain new and useful Improvements in Shock-Shifter Hubs, of which the following is a specification.

My invention relates to an improved method of absorbing shock caused by the impinging of a vehicle wheel upon an irregular surface such as an ordinary road.

I have discovered that if layers of superimposed balls of sufficiently hard material such as steel are placed around the hub of a wheel or the like in such a manner that the axle or attachment thereto is entirely supported by the aforesaid balls, a much easier motion is attained during the passage of the wheel over a road surface. Shock is largely prevented from reaching the axle or fabric of the carriage and a uniform smooth movement is imparted to the wheel.

My invention is not necessarily limited to the use of balls, although in practice I find these to be preferable. Other rounded forms of metal, wood or other substances can be arranged to produce a like effect, such for instance as roller bearings, or roller bearings combined with balls.

I have discovered that in order to obtain the desired effect a more or less free space must be left in the chamber inclosing the balls, in order that when the road shocks are transferred through the rim and fellies of the wheel to the hub, free motion can immediately take place at the extremely mobile points of contact between the superimposed and tangentially supported balls, and the road shock is dissipated in friction between the aforesaid balls and the contact points with the axle and the walls of the chamber respectively, this action being probably due to the constant deflection of the angle of shock owing to the numerous fine points of contact of the balls which causes the shock or force to run around and be taken up among the balls, (causing rotary motion among them), and thereby preventing the shock from reaching the axle.

In order more clearly to set forth my invention and the best method at present known to me for putting it into effect, I have illustrated it in one constructional form in the accompanying drawing, in which Figure 1 shows a diagram of the center of a motor car wheel of the artillery pattern provided with my invention, and Fig. 2 shows a section of Fig. 1 on the line X—Y.

In these drawings, 1 indicates the spokes of the wheel here shown broken off, 2 indicates steel bolts assisting to bind the heads of the spokes firmly together, 3 represents the outer hardened steel sleeve of the wheel hub, which sleeve receives the thrust of the spokes and has free movement up and down between the side plates through which the bolts 2 pass, while 5 is a similar inner hardened steel sleeve working between said plates. 4 is the ball chamber, 6 the axle box and 7 the axle itself. Lubricating devices etc. are not shown in the drawing as forming no portion of my present invention.

It will be seen on examination of these drawings that the ball bearings of my invention are not applied in the ordinary manner for the reduction of the rotary friction of the hub upon the wheel axle, but the use of the balls is to absorb more or less perfectly the road shock as already stated. For this purpose the interior of the ball chamber is not entirely filled with the balls but sufficient space is left to permit more or less mobility of the balls in the chamber and allow them to slip or move on one another. Under the stress of the rotation of the wheel and the weight of the vehicle the balls tend to arrange themselves somewhat as indicated in Fig. 1, leaving the space 8 more or less free and extending in a V shape from the outer to the inner wall of the ball chamber. The position of this more or less free space will somewhat depend on the speed of rotation of the wheel.

I may construct the wheel with metal flange on either side of the hub, which metal flanges are connected by bolts also within predetermined limits. These bolts may be protected from shearing action by rubber or other substances. I may use a hub of any convenient construction and I may cushion with rubber or other resilient substance the metal covering within the hub upon which these shock absorbing balls rotate and revolve. I may also place within the ball area movable bolts so as to give greater rigidity in driving in certain cases, and as already stated I do not limit my invention to the use of spherical balls only. I have found that hubs of this type are especially serviceable where a harder substitute is used for a cushion or pneumatic tire, such for instance as a leather tire or a composite tire of metal and other substances suitable for motors and other vehicles.

The application of my shock absorbing hub is moreover not limited to road vehicles only as above set forth, but is applicable to any position in which wheels are subjected to sudden shocks transmitted from the periphery towards the center. My invention is also applicable to any mechanical device where it is desired to reduce vibration.

Having now particularly described and ascertained the nature of my said invention and in what manner the same is to be performed, I declare that what I claim is:—

1. The improved mechanism for absorbing shocks transmitted from the periphery of a wheel to its center, consisting of a ball chamber surrounding the central hub and containing a number of balls, rollers or other rotatable elements superimposed in layers upon one another and having a free space within the chamber; said rotatable elements so superimposed as to receive and distribute the shocks by slipping over one another, substantially as described.

2. The improved shock absorbing hub for wheels of road or rail vehicles comprising a ball chamber formed between two freely movable steel sleeves, the outer of which receives the thrust transmitted from the rim of the wheel.

3. In a shock dissipating hub, the combination of a wheel hub, steel sleeves separated from one another by a ball-containing space in which the balls are free to move on one another as described, flanges between which said sleeves work, and wheel spokes whose thrust is received by the outer sleeve, as and for the purpose described.

Signed at Glasgow, in the county of Lanark, Scotland, this fourth day of April, A. D. 1906.

JOHN MUIR.

Witnesses:
　FRED MIDDLETON,
　FRED. TAYLOR.